(12) United States Patent
Kwan

(10) Patent No.: US 10,262,205 B2
(45) Date of Patent: Apr. 16, 2019

(54) METHOD AND SYSTEM FOR COLLABORATIVE MULTI-SATELLITE REMOTE SENSING

(71) Applicant: Chiman Kwan, Rockville, MD (US)

(72) Inventor: Chiman Kwan, Rockville, MD (US)

( * ) Notice: Subject to any disclaimer, the term of this patent is extended or adjusted under 35 U.S.C. 154(b) by 143 days.

(21) Appl. No.: 15/212,662

(22) Filed: Jul. 18, 2016

(65) Prior Publication Data

US 2017/0235996 A1 Aug. 17, 2017

Related U.S. Application Data

(60) Provisional application No. 62/197,864, filed on Jul. 28, 2015.

(51) Int. Cl.
*G06K 9/62* (2006.01)
*G06K 9/00* (2006.01)
*G06T 7/33* (2017.01)
*G06T 7/35* (2017.01)
*G06T 3/00* (2006.01)

(52) U.S. Cl.
CPC .......... *G06K 9/0063* (2013.01); *G06K 9/627* (2013.01); *G06K 9/6289* (2013.01); *G06T 3/0068* (2013.01); *G06T 7/33* (2017.01); *G06T 7/35* (2017.01); *G06K 2009/00644* (2013.01);
(Continued)

(58) Field of Classification Search
CPC ............ G06K 9/0063; G06T 7/97; G06T 2207/10032; G06T 2207/30181; G06F 3/0481
See application file for complete search history.

(56) References Cited

U.S. PATENT DOCUMENTS 7,058,197 B1 * 6/2006 McGuire ............ G06K 9/00657
382/100
7,194,111 B1 * 3/2007 Schaum ................... G01V 8/10
348/144
(Continued)

OTHER PUBLICATIONS

David W. J. Stein et al. "Anomaly Detection from Hyperspectral Imagery", IEEE Signal Processing Magazine, Jan. 2002, pp. 58-69.*
(Continued)

*Primary Examiner* — Samir A Ahmed

(57) ABSTRACT

The present invention is to incorporate a novel two-step image registration algorithm that can achieve sub-pixel accuracy in order to provide a method and system that can significantly improve the remote monitoring performance of coral reefs and volcanoes using a future NASA remote imager known as HyspIRI, by increasing the spatial and temporal resolution of remote sensing data from multiple satellites. Our invention focuses on change detection, multiple images registration, target detection, coral reef and volcano monitoring. The objectives are achieved by accurate and early change detection in coral health, and volcanic activities, such as, by detecting color changes in crater lakes; accurate bottom-type classification in coral reefs; accurate concentration estimation of $SO_2$, volcanic ashes, etc.; high temporal resolution of monitoring so that early mitigation steps can be activated; and high spatial resolution in multispectral and hyperspectral images. The same system can also be applied to other remote monitoring applications, such as, soil moisture monitoring.

19 Claims, 22 Drawing Sheets

2-step image registration approach

(52) U.S. Cl.
CPC ............... *G06T 2207/10032* (2013.01); *G06T 2207/30181* (2013.01)

(56) References Cited

U.S. PATENT DOCUMENTS

| | | | | |
|---|---|---|---|---|
| 7,792,321 | B2* | 9/2010 | Palmadesso | G01J 3/28 382/100 |
| 8,675,989 | B2* | 3/2014 | Robinson | G01J 3/0264 382/232 |
| 2008/0123097 | A1* | 5/2008 | Muhammed | G01J 3/02 356/419 |
| 2012/0068863 | A1* | 3/2012 | Tillotson | G01S 13/003 340/963 |
| 2016/0247011 | A1* | 8/2016 | Abileah | G06K 9/0063 |

OTHER PUBLICATIONS

PJ Mumby et al., "Remote sensing of coral reefs and their physical environment", Marine Pollution Bulletin 48 (2004), pp. 219-228.*

H. Holten et al. "Spectral Discrimination of Healthy and Non-Healthy Corals Based on Cluster Analysis, Principal Components Analysis, and Derivatives Spectroscopy", Remote Sens.Environ. 65 (1998) pp. 217-224.*

M. Moeller, T. Wittman, and A. L. Bertozzi, "A Variational approach to Hyperspectral Image Fusion,", SPIE Conference on Defense Security and Sensing, Apr. 2009; and "Variational Wavelet Pan-Sharpening," IEEE Trans. on Geoscience and Remote Sensing, 2008.

"Kernel RX-Algorithm: A Nonlinear Anomaly Detector for Hyperspectral Imagery," by H. Kwon, N.M. Nasrabadi, IEEE Transactions on Geoscience and Remote Sensing, vol. 43, No. 2, Feb. 2005.

"Locally Adaptive Sparse Representation for Detection, Classification, and Recognition," by T.D. Tran, The Signals and Systems Area Seminar, Johns Hopkins University, Baltimore MD.

Konstantinos G. Derpanis, "Overview of the RANSAC Algorithm," Lecture Notes, York University, Canada, 2010.

"A Parameterization of Deformation Fields for Diffeomorphic Image Registration and Its Application to Myocardial Delineation," by Hua-mei Chen, Aashish Goela, Gregory J. Garvin, and Shuo Li; Medical Image Computing and Computer-Assisted Intervention, MICCAI, 2010, Lecture Notes in Computer Science, vol. 6361, 2010, pp. 340-348.

Steven Johnson, "Comments on 'Orthogonal Subspace Projection (OSP) Revisited: A Comprehensive Study and Analysis,'" IEEE Transactions on Geoscience and Remote Sensing, vol. 45 Issue:2, 2007.

Alan P. Schaum and Alan Stocker, "Hyperspectral change detection and supervised matched filtering based on covariance equalization", Proc. SPIE 5425, Algorithms and Technologies for Multispectral, Hyperspectral, and Ultraspectral Imagery X, 77 (Aug. 12, 2004).

"Representation Learning: A review and New Perspectives," by Yoshua Bengio, Aaron Courville, and Pascal Vincent, IEEE Transactions on Pattern Analysis and Machine Intelligence, 2013.

* cited by examiner

|  |  | 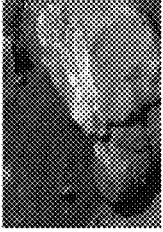 | 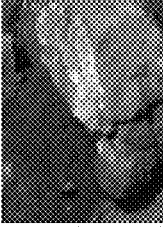 |
|---|---|---|---|
| Reference image (Left Mastcam image)<br><br>Fig. 9(a) | Image to be aligned (Right Mastcam Image)<br><br>Fig. 9(b) | Initial alignment with RANSAC (Right Mastcam image). This is the first step in registration process<br><br>Fig. 9(c) | Final alignment with Diffeomorphic Registration which is the second step of registration process (Right Mastcam image)<br><br>Fig. 9(d) |

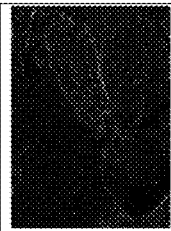
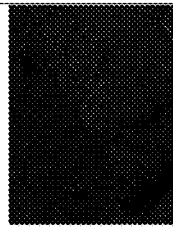
Error between reference image and initial alignment image with RANSAC (both images are normalized with respect to maximum pixel value).
Fig. 10(a)
Error between reference image and final alignment image with Diffeomorphic registration (both images are normalized with respect to maximum pixel value)
Fig. 10(b)

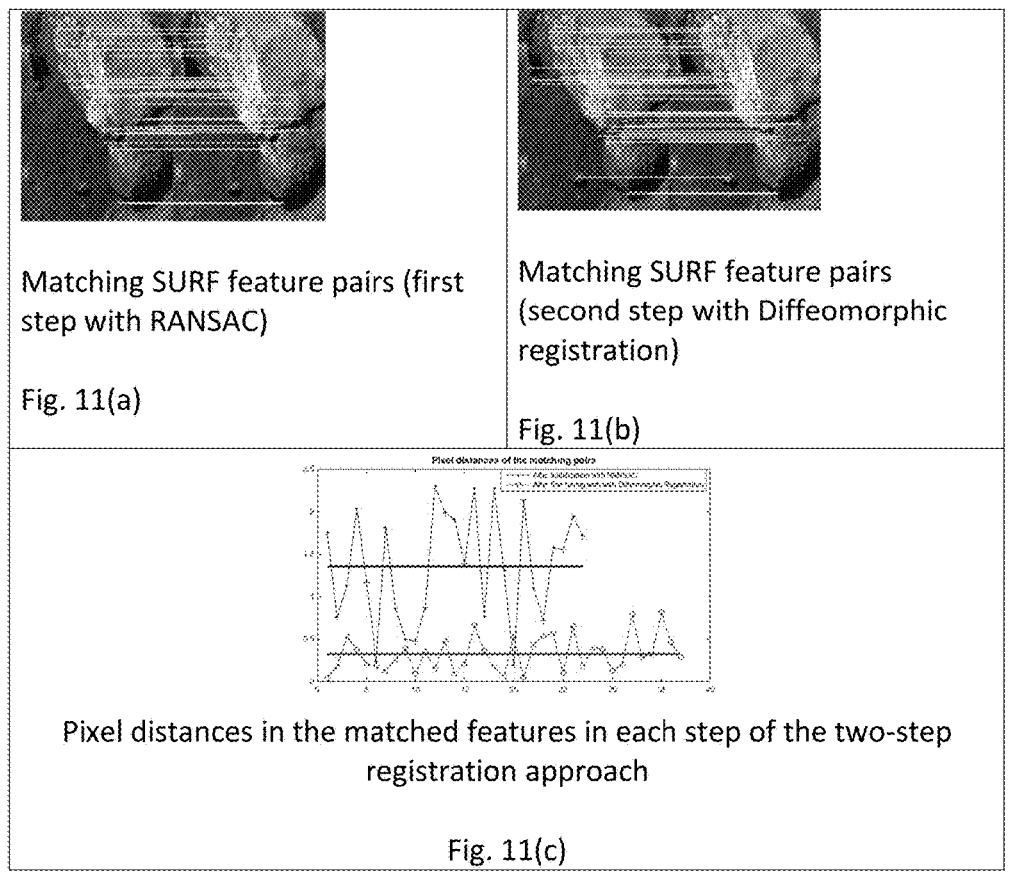

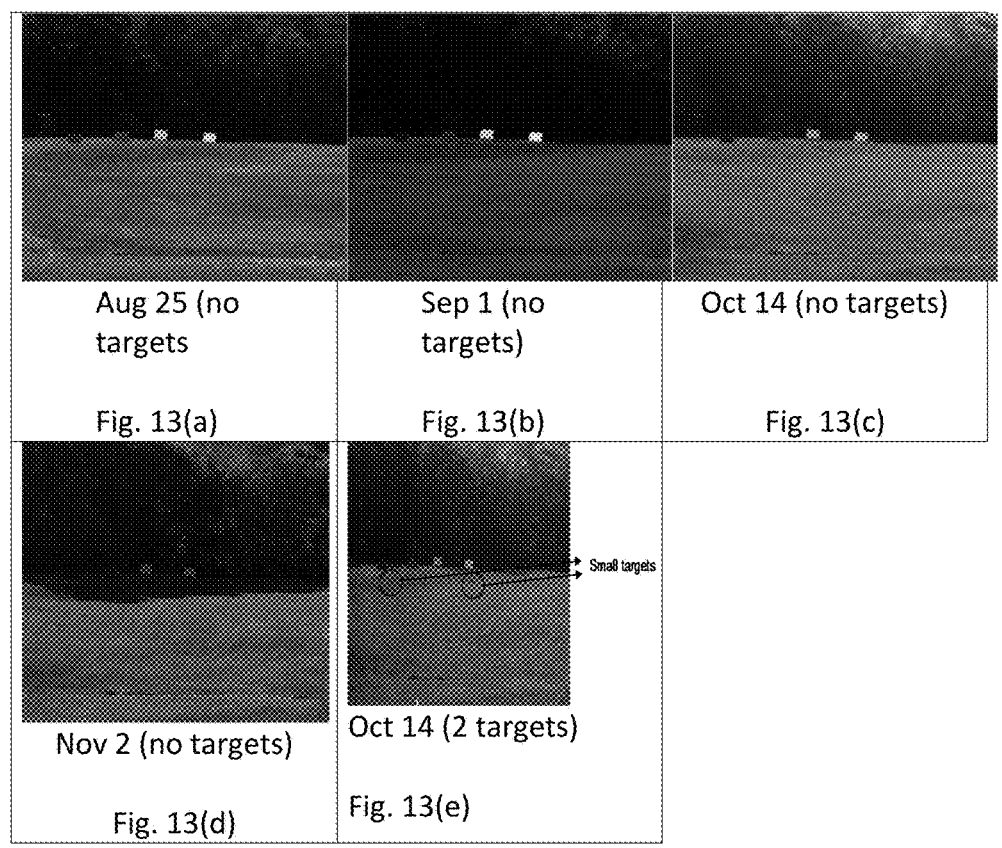

Fig. 16 (b)

Errorsum values for 66 samples in leave-one-out testing (lower errorsum values indicate better estimation accuracy)

RMSEP values for each oxide compound (there are 9 oxides, lower RMSEP indicates better estimation accuracy)

METHOD AND SYSTEM FOR COLLABORATIVE MULTI-SATELLITE REMOTE SENSING

This application claims priority to U.S. Provisional Patent Application No. 62/197,864 filed on Jul. 28, 2015, the entire content of which is incorporated herein by reference.

BACKGROUND OF THE INVENTION

The present invention is to incorporate a novel two-step image registration algorithm that can achieve sub-pixel accuracy in order to provide a method and system that can significantly improve the remote monitoring performance of coral reefs and volcanoes using a new NASA remote imager known as HyspIRI, as shown in website: http://hyspiri.jpl.nasa.gov/science. The present invention accomplishes these objectives by increasing the spatial and temporal resolution of remote sensing data from multiple satellites. The system of the present invention can also be applied to other remote monitoring applications, such as, soil moisture monitoring. There are other existing remote sensing data sources, such as, the satellite imager IKONOS owned by Digital Globe, the Moderate Resolution Imaging Spectroradiometer (MODIS), and the NASA satellite program LANDSAT.

Multi-satellite remote sensing systems used in the past mainly focus on data collection. The present invention focuses on change detection, multiple images registration, target detection, coral reef and volcano monitoring.

SUMMARY OF THE INVENTION

The present invention is expected to significantly improve the state-of-the-art remote sensing performance in several important aspects: 1) accurate and early change detection in coral health, e.g. bleaching, and volcanic activities, e.g. color changes in crater lakes; 2) accurate bottom-type classification in coral reefs; 3) accurate concentration estimation of $SO_2$, volcanic ashes, etc.; 4) high temporal resolution of monitoring so that early mitigation steps can be activated; 5) high spatial resolution in multispectral images.

One embodiment of the present invention is to provide a method and system that can significantly improve the remote monitoring performance of coral reefs and volcanoes using a new NASA remote imager known as HyspIRI, by increasing the spatial and temporal resolution of remote sensing data from multiple satellites. The same system can also be applied to other remote monitoring applications, such as, soil moisture monitoring. Other existing remote sensing data sources are known, e.g. IKONOS, MODIS, and LANDSAT as mentioned above.

Another embodiment of the present invention is to incorporate a novel two-step image registration algorithm that can achieve sub-pixel accuracy. This algorithm enables accurate image alignment between two images collected at different times from the same sensor or between two images collected at the same time from different sensors.

Another embodiment of the present invention is to utilize a novel spatial resolution enhancement algorithm to improve the spatial resolution of satellite images. This will allow users to see fine details of changes in coral reefs and volcanoes.

Another embodiment of the present invention is to adopt a novel change detection system that can accurately determine changes between any two remote sensing images. Within the change detection system, there are residual generation and robust anomaly detection algorithms.

Another embodiment of the present invention is to incorporate an accurate Deep Neural Network (DNN) algorithm for concentration estimation of certain chemicals such as $SO_2$, volcano ashes, etc.

Another embodiment of the present invention is to apply a novel sparsity based algorithm for bottom-type classification in coral reefs.

Another embodiment of the present invention is that the processing software can be executed in a local personal computer or in a Cloud.

Another embodiment of the present invention is to provide user friendly graphical user interface (GUI) that will allow operators to visualize environmental changes over time.

BRIEF DESCRIPTION OF THE DRAWINGS

FIGS. 9(a) to 9(d) show the alignment results with the two-step registration approach.

FIGS. 10(a) to 10(b) show the error difference images with the two-step registration process.

FIGS. 11(a)-11(c) show the evaluation of the alignment accuracy with a pixel-distance based measure in the two-step registration process.

FIGS. 13(a)-(d) show images with no targets, and 13(e) shows image with small targets.

FIGS. 16(a) & 16(b) show face images of subject-1 in 64 different lighting conditions in the Yale B database.

DETAILED DESCRIPTION OF THE INVENTION

Figure 1A:
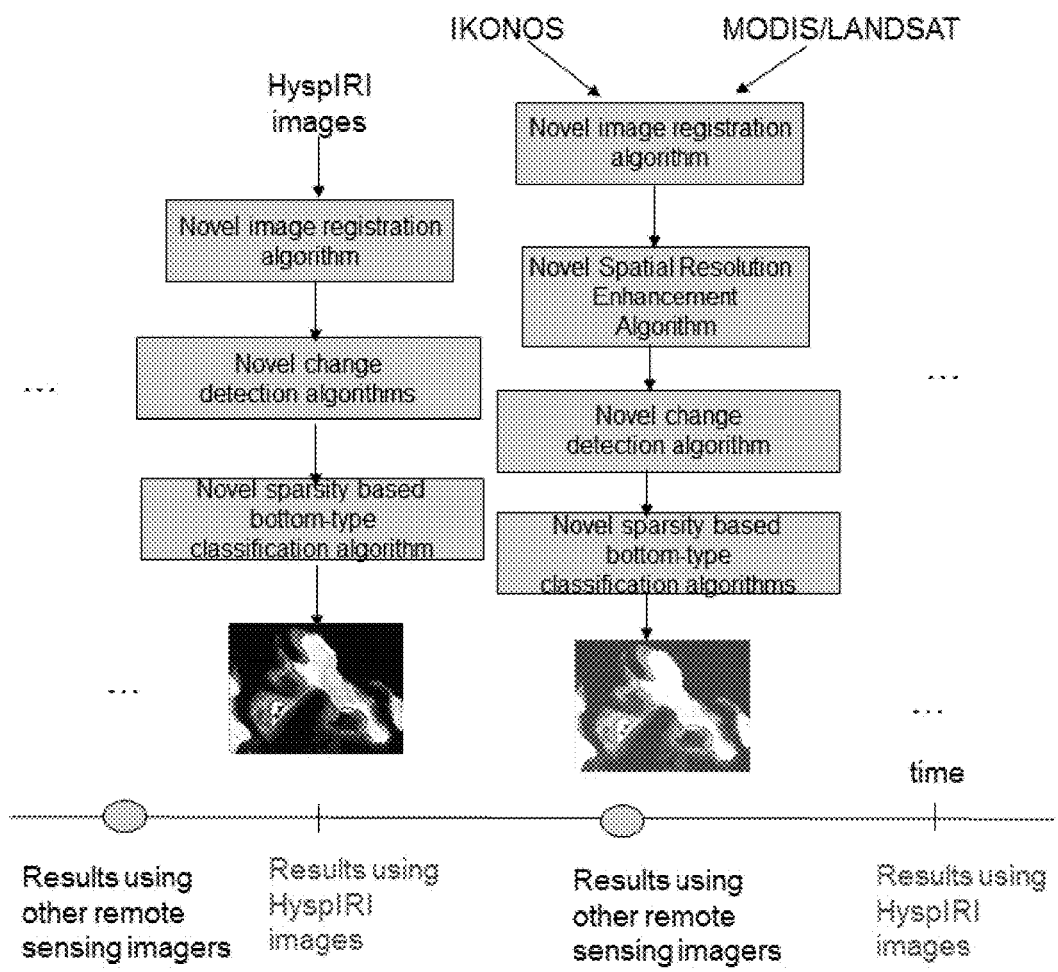
FIGS. 1(a) & 1(b) are high performance monitoring system for coral reefs and volcanoes.
Figure 1B:
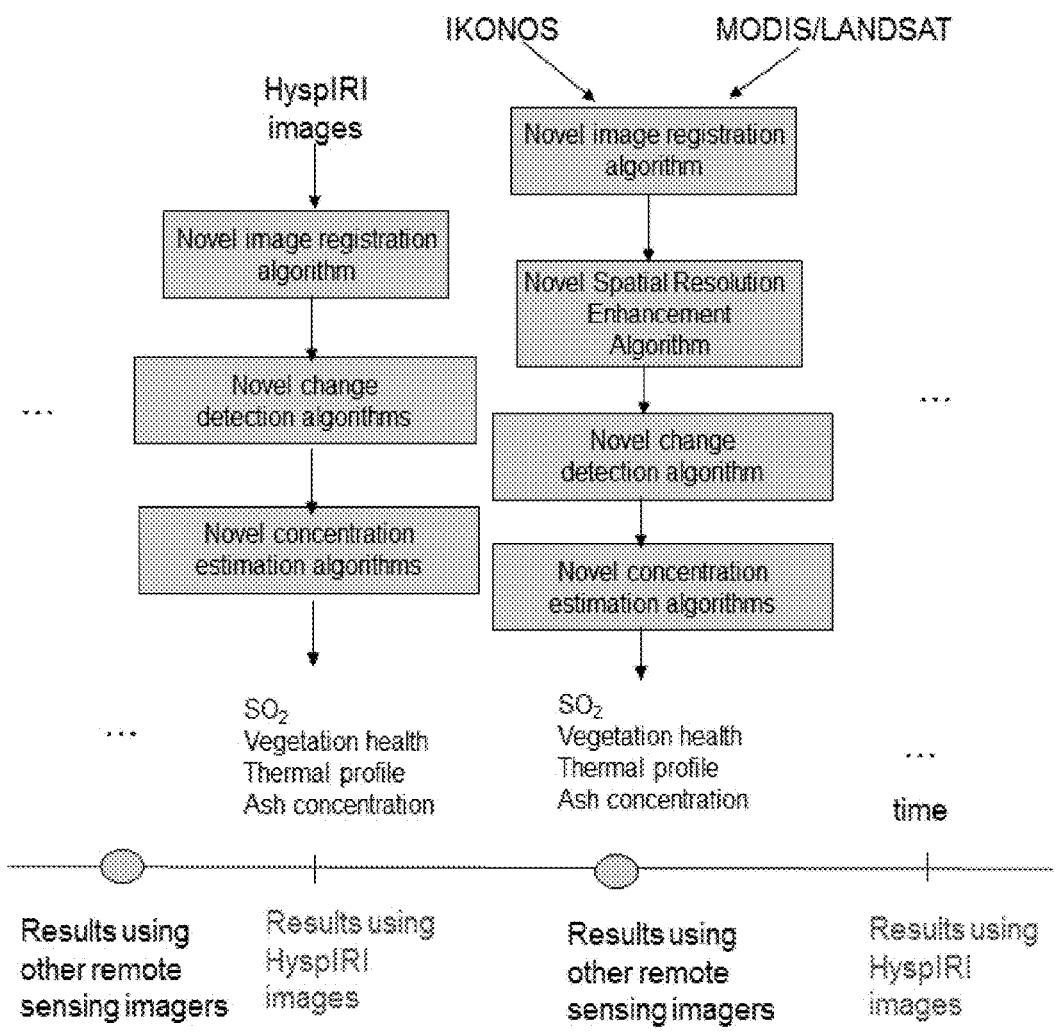

FIG. 1 shows the architectures of coral reef monitoring (FIG. 1a) and volcano monitoring (FIG. 1b). It can be seen that some algorithms such as image registration, change detection, and spatial resolution enhancement are common in both architectures. Accurate image registration is a prerequisite to change detection. The present invention proposes a novel and accurate 2-step algorithm to achieve sub-pixel registration accuracy. Initial alignment test results using a multispectral imager, such as, a mast camera (MASTCAM), used in the Mars rover clearly showed that the proposed algorithm is promising. The 2-step algorithm can be applicable to RGB, multispectral and hyperspectral images. In the change detection part, a proven and high performance framework is utilized to accurately determine the changes. A change detection algorithm is applied to some hyperspectral images from the US Air Force achieving superior performance. In the spatial resolution enhancement part, a novel algorithm that incorporates a high spatial resolution RGB image from a Geo-eye, IKONOS and another multispectral or hyperspectral image, is applied to generate a high spatial resolution multispectral/hyperspectral image. Preliminary test results showed that the performance is very encouraging, improving the spatial resolution of MODIS/LANDSAT by fusing those multispectral images with a high spatial resolution RGB image from IKONOS.

In other words, when there is no HyspIRI data, the improved MODIS/LANDSAT images to monitor the coral reefs and volcanoes are used. As a result, the temporal resolution will be improved 2 to 3 times. As shown in FIG. 1a, a novel sparsity based algorithm of the present invention for bottom-type classification in coral reef monitoring is used. The algorithm is applicable to both multispectral and hyperspectral images. As shown in FIG. 1b, a novel and accurate deep neural network (DNN) algorithm of the present invention for concentration estimation of $SO_2$, volcanic ashes, etc. is used.

The following sections describe the details of the components of the present invention system for monitoring coral reefs and volcanoes.

1. Novel Two-Step Image Registration Algorithm

Figure 2:
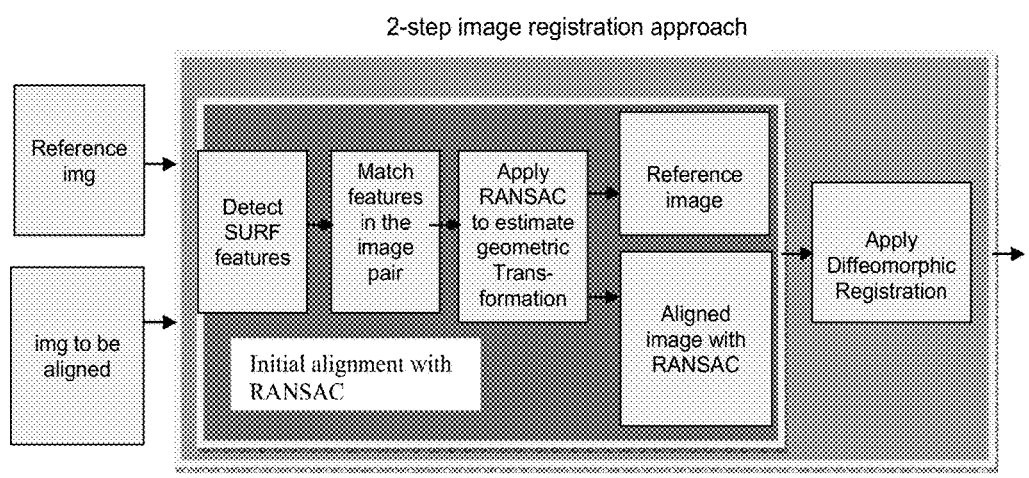
FIG. 2 shows the two-step image registration approach.

Accurate image registration is important in monitoring changes in coral reefs and volcanoes. As shown in FIG. 2, image registration is needed in aligning the same type of images collected at different times or different types of images collected at the same time, e.g. IKONOS and LANDSAT. After image registration/alignment, change detection can then be performed.

The block diagram of the two-step image registration approach is shown in FIG. 2, given two images, the first step corresponds to initialization with a Random Sample Consensus (RANSAC). In this first step, Speeded Up Robust Features (SURF) are detected in both images; these features are then matched; followed by applying RANSAC to estimate the geometric transformation. Assuming one image is the reference image; the other image content is then projected to a new image that is aligned with the reference image using the estimated geometric transformation with RANSAC. The second step uses the RANSAC-aligned image and the reference image and applies a Diffeomorphic Registration.

2. Novel Spatial Resolution Enhancement Algorithm

The 19-day revisit time of the VSWIR imager in HyspIRI may be too long for vegetation health monitoring near volcanoes and coral life monitoring in the presence of sediments. It is necessary to utilize other remote sensing instruments, such as, the IKONOS, MODIS, and LANDSAT to generate some intermediate monitoring results between HyspIRI measurements. However, in order to have consistent results for easy comparison, it is necessary to improve the spatial resolution of MODIS/LANDSAT (250 m/1 km) by fusing them with IKONOS (0.5 m) to match with HyspIRI spatial resolution of 60 m. A novel algorithm to generate high spatial resolution images for MODIS/LANDSAT will be presented here.

In remote sensing domain, a common and successful approach to achieving super resolution is pan-sharpening. Pan-sharpening is an image fusion technique which uses a high resolution single band panchromatic (pan) image and low resolution multi-spectral image to produce high resolution multi-spectral images. Compared to multi-view based and example based super-resolution technique, pan-sharpening can produce much higher resolution data and is much more reliable and accurate. Actually, the pan-sharpening idea can also be applied to hyperspectral images. The present invention introduces a novel approach which extends the idea of pan-sharpening by using multiple high resolution bands to reconstruct high resolution hyperspectral image. The motivation is practical: there are many satellite sensors or airborne sensors which take high resolution color images. For instance, the resolution of IKONOS color image data is 0.5 meter, as shown in Google Map, http://maps.google.com. We may combine those data with MODIS or LANDSAT data to generate high resolution multispectral image data. Specifically, we developed an algorithm called color mapping, which is efficient and parallelizable. We performed extensive studies and results to show that our method can generate highly accurate high resolution reconstruction than simple bi-cubic scaling and other state-of-the-art methods using the variational wavelet pan-sharpening (VWP) technique. In addition, very thorough classification study using reconstructed images are performed. As a result, the method of the present invention performs much better than other methods in the past.

Color Mapping

The idea of color mapping is as the name suggests: mapping a color pixel to a hyperspectral pixel. This mapping is based on a transformation matrix T, i.e.

Figure 3:
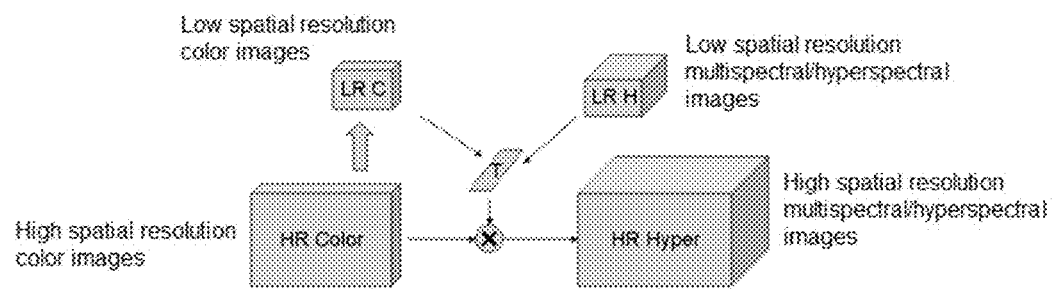
FIG. 3 shows the system flow of color mapping.
Figure 4:
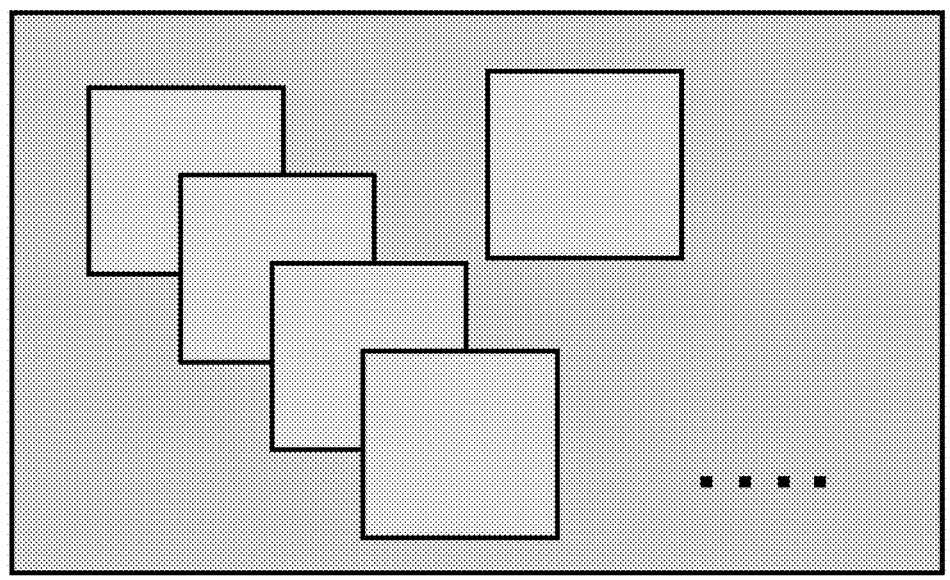
FIG. 4 shows the system flow of hybrid color mapping.
Figure 5:
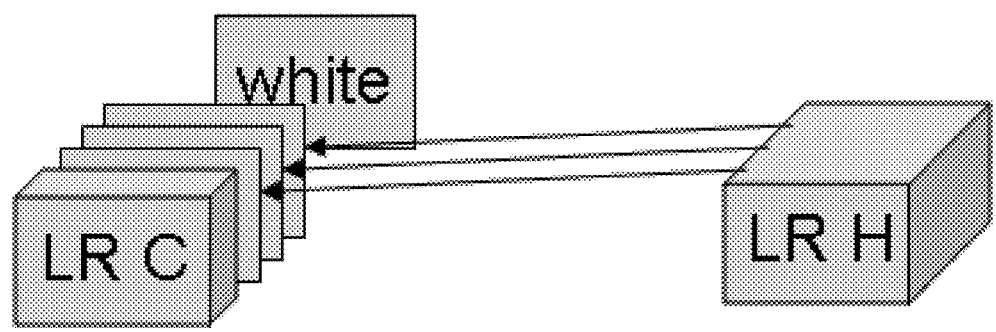
FIG. 5 shows the local color mapping.

$X=Tx$ where X is one (or more) hyperspectral pixels and x is one (or more) color pixels. To get the transformation matrix, we simulate a low resolution color image and use the low resolution hyperspectral image to train the T. FIG. 3 shows the system flow.

Training is done by minimizing the mean square error:

$$T^* = \arg\min_{T} \|H - TC\|_F$$

where H is the set of hyperspectral pixels and C is the set of color pixels. With enough pixels, the optimal T can be determined with:

$T=XC^T(CC^T)^{-1}$

Hybrid Color Mapping

For many hyperspectral images, the band wavelengths range from 0.4 to 2.5 um. For color images, the R, G and B wavelengths are 0.65 um, 0.51 um, and 0.475 um, respectively. Therefore, the three color bands may have little correlation with higher number bands. To mitigate this issue, we extract several high number bands from low resolution multispectral/hyperspectral image and stack them with low resolution color bands. In mapping process, those bands with bi-cubic method are up-scaled, and then stacking them with high resolution color image. Except for hyperspectral image bands, a white band is also added, i.e. all pixel value is 1. This white band can be used to compensate for atmospheric effect and other bias effects. Mathematically, adding a white band is equivalent to increasing one more column in the T matrix. Hence, more parameters to adjust in the transformation can be achieved.

Local Color Mapping

The method of our invention can be further enhanced by applying color mapping patch by patch. A patch is a sub-image in the original image. Each patch will have a local transformation matrix. In this way, spatial correlation can be exploited. In addition, since the task is split to many small tasks, the process can be easily parallelized.

3. Novel Change Detection Algorithm

Figure 6:
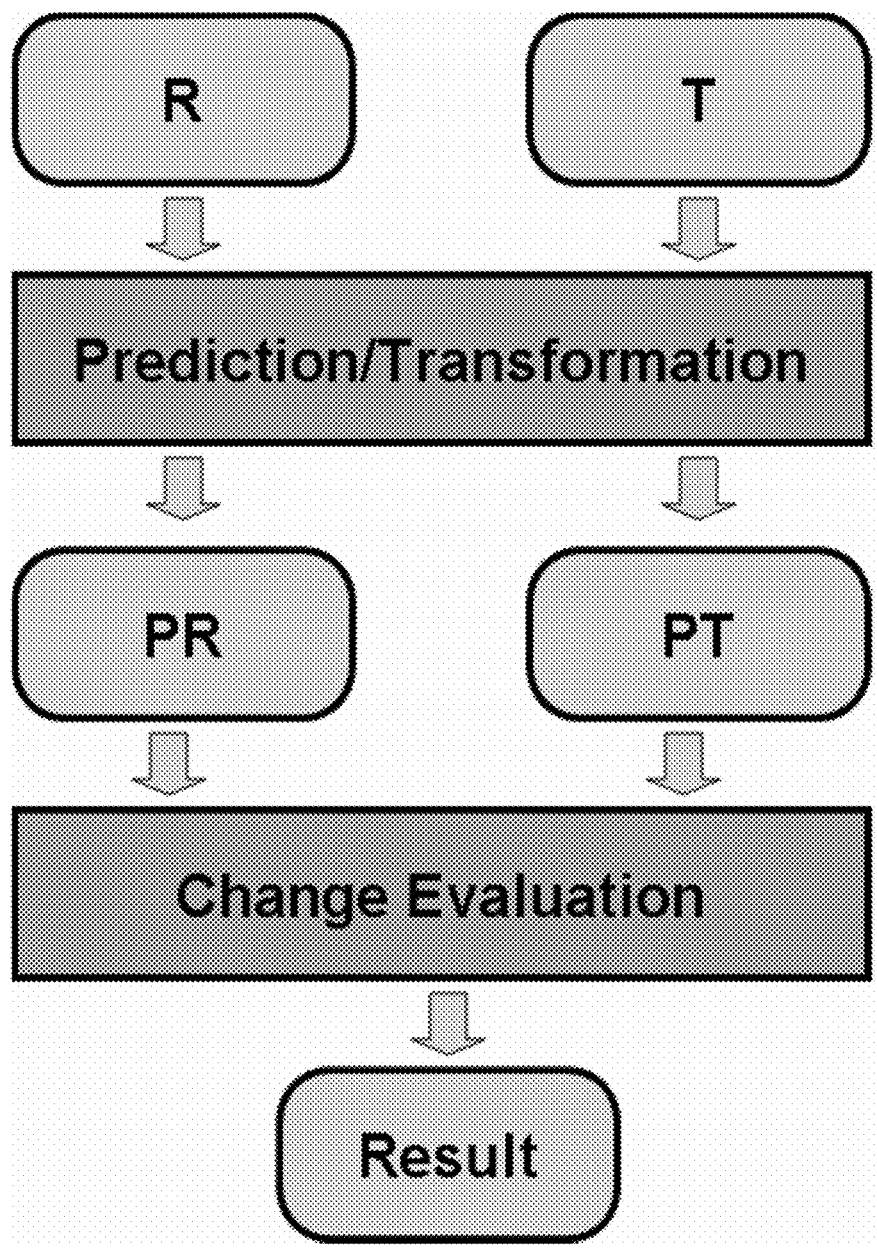
FIG. 6 shows the change detection between two images.

For coral reef and volcano monitoring, change detection algorithm is absolutely essential. As shown in FIG. 6, change detection involves two images, which can be from the same imager collected at different times. Further, FIG. 6 shows a simplified view of change detection, which has two parts:

1) Prediction/Transformation. Transform the original reference image (R) and testing image (T) to new space as PR and PT.
2) Change Evaluation. Evaluate the difference between the transformed image pair and output a change detection image.

First, the present invention uses a Chrono-Chrome (CC) algorithm to generate residuals. The CC algorithm is first summarized by A. SCHAUM and A. STOCKER, International Symposium, Spectral Sensing Res., 2008.

CC Algorithm

1. Compute mean and covariance of R and T as $m_R$, $C_R$, $m_T$, $C_T$;
2. Compute cross-covariance between R and T as $C_{TR}$; and
3. Execute transformation.

$$PR(i)=C_{TR}C_R^{-1}(R(i)-m_R)+m_T, PT=T$$

Cluster Kernel RX to Detect Changes

Kernel RX is a generalization of the RX algorithm. When the kernel distance function is defined as the dot product of two vectors, kernel RX is the same as RX. While kernel RX is more flexible than RX, it is significantly slower than RX. In the present invention, a novel algorithm which can perform a fast approximation of kernel RX is presented. The algorithm is based on clustering, called Cluster Kernel RX (CKRX). As a matter of fact, CKRX is a generalization of kernel RX, i.e. CKRX is reduced to kernel RX under some particular settings.

The basic idea of CKRX is to first cluster the background points and then replace each point with its cluster's center. After replacement, the number of unique points is the number of clusters, which can be very small comparing to the original point set. Although the total number of points does not change, the computation of the anomaly value can be simplified using only the unique cluster centers, which improves the speed by several orders of magnitudes.

It is well known that image registration may not be perfect. In addition, parallax is an important practical issue during data collection. Hence, a robust change detection algorithm such as CKRX is needed.

4. Novel Bottom-Type Classification Algorithm

Figure 7:
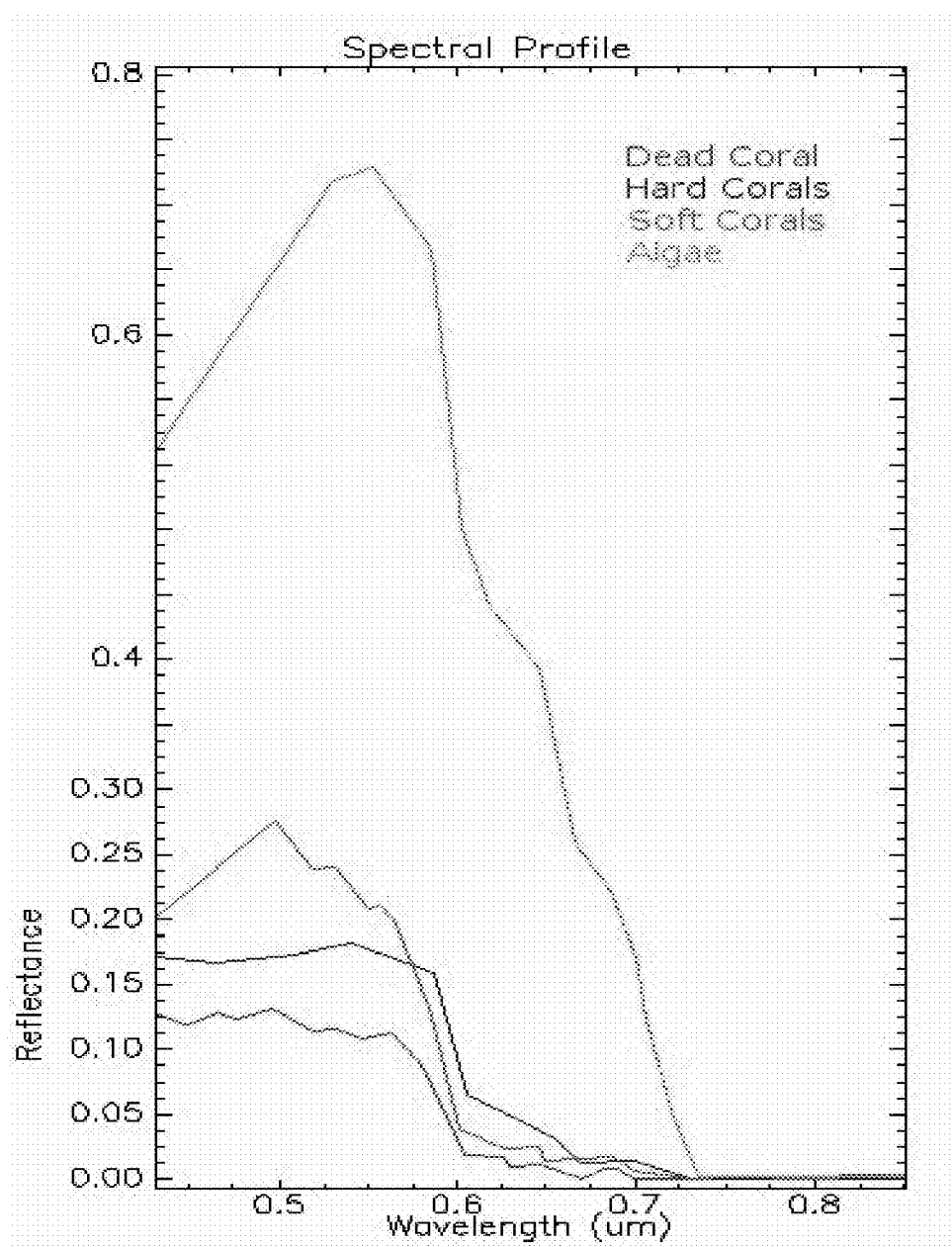
FIG. 7 shows the spectral signatures of some corals.

In coral reef monitoring, accurate bottom-type classification is important for mapping out coral types. In the reference, "Multiple View Geometry in Computer Vision," by R. Hartley and A. Zisserman mentioned above, it was shown that classification results using multispectral is better than color images. Although there are some existing classification algorithms, such as, SAM, OSP, etc. as shown in the literature, "Hyperspectral Imaging: Techniques for Spectral Detection and Classification," by C. I. Chang, Kluwer Academic/Plenum Publishers, New York, N.Y., 2003. The present invention proposes to apply the latest development in sparsity based classification algorithm to bottom type classification. Similar to other method, this approach requires some spectral signatures to be available. FIG. 7 shows the spectral signatures of several corals.

The present invention implemented a sparsity-driven face recognition method which was introduced in the reference by T. D. Tran, "Locally Adaptive Sparse Representation for Detection, Classification, and Recognition". The Extended Yale B face database has been used for performance evaluation. In the present invention, in addition to the frontal face images, rotation effects to the test face images are introduced to examine the robustness of the global (whole face) and local (blocks of the face image) versions of the method. The Yale B database contains face images with different illuminations, which are very challenging.

In the sparsity-driven face recognition approach, the assumption is that a face image of subject i lies in the linear span of the existing face images for that same subject i in the training set. Suppose $\{v_{i1}, v_{i2}, \ldots, v_{iD}\}$ are the vectorized D face images of subject i in the training set, and y is a new vectorized face image of subject i, which is not in the training set. Based on this assumption, y, can be expressed as:

$$y = \alpha_{i1}v_{i1} + \alpha_{i2}v_{i2} + \ldots + \alpha_{iD}v_{iD} = [v_{i1} \ v_{i2} \ \ldots \ v_{iD}]\begin{bmatrix} \alpha_{i1} \\ \alpha_{i2} \\ \vdots \\ \alpha_{iD} \end{bmatrix} = A_i\alpha_i \quad (1)$$

Suppose there are C human subjects; the above expression can then be expanded as in expression (2) below. This expression indicates that y is the sparse linear combination of face images in the training set.

$$y = [A_1 \ A_2 \ \ldots \ A_c]\begin{bmatrix} \alpha_1 \\ \alpha_2 \\ \vdots \\ \alpha_C \end{bmatrix} = Ax \quad (2)$$

The sparse representation, $x_0=[0 \ldots 0 \ \alpha_i^T \ 0 \ldots 0]$, thus yields the membership of y to subject i. The above framework to small contact detection can be easily extended. Each contact image will be vectorized and put into the dictionary. Of course, many images of the potential contacts, such as, cruise ship, fishing boats, yachts, cargo ships, tug boats, etc. will need to be collected.

Figure 8:
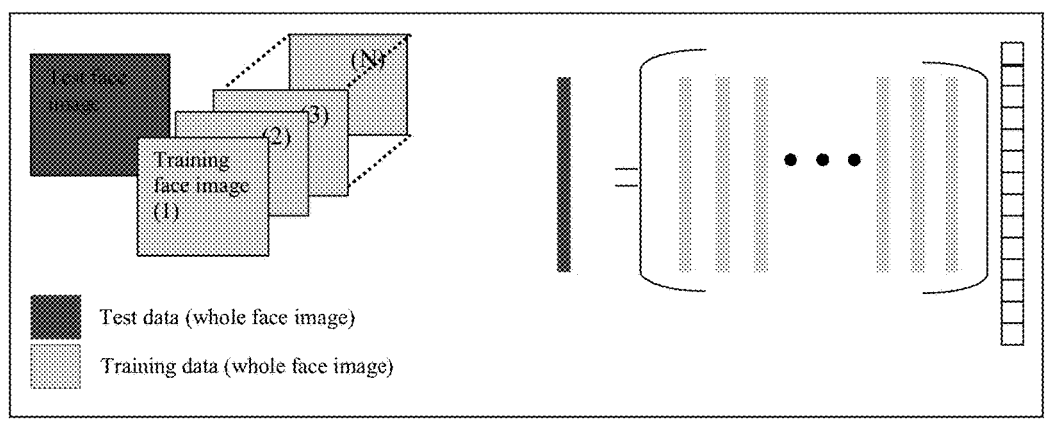
FIG. 8 shows a diagram of the global version of the sparsity-driven face recognition method.
Figure 12A:
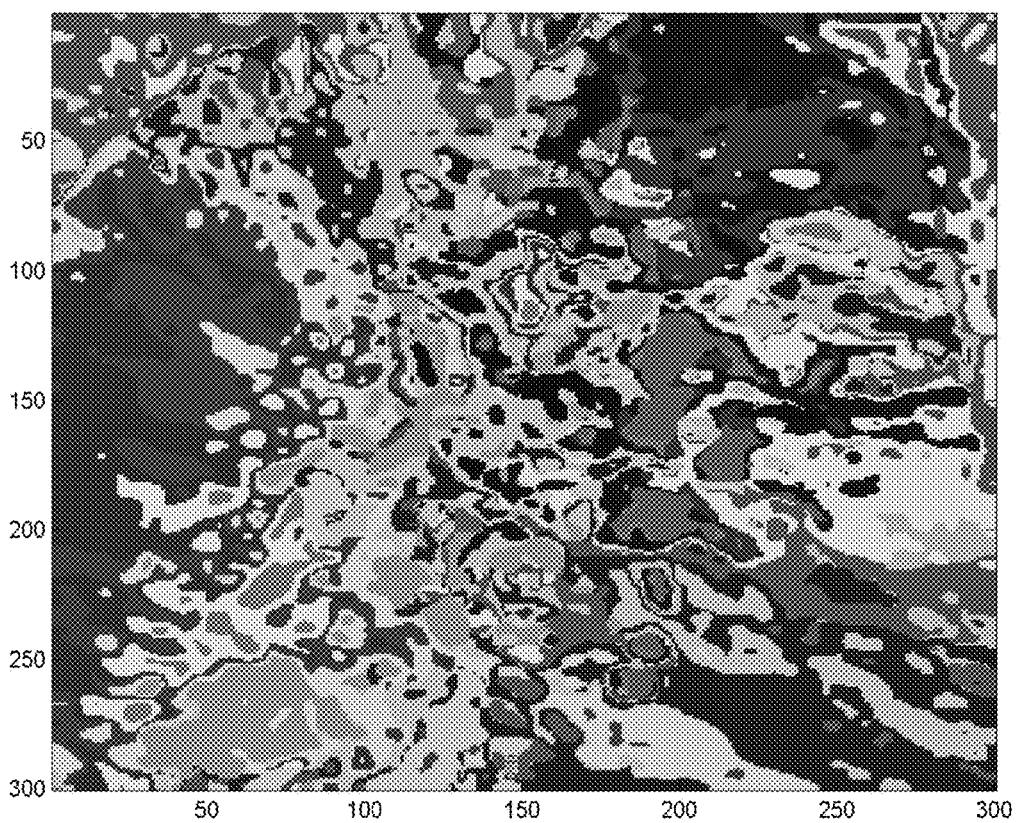
FIGS. 12(a)-12(d) show the comparison of spatial resolution enhancement methods.
Figure 12B:
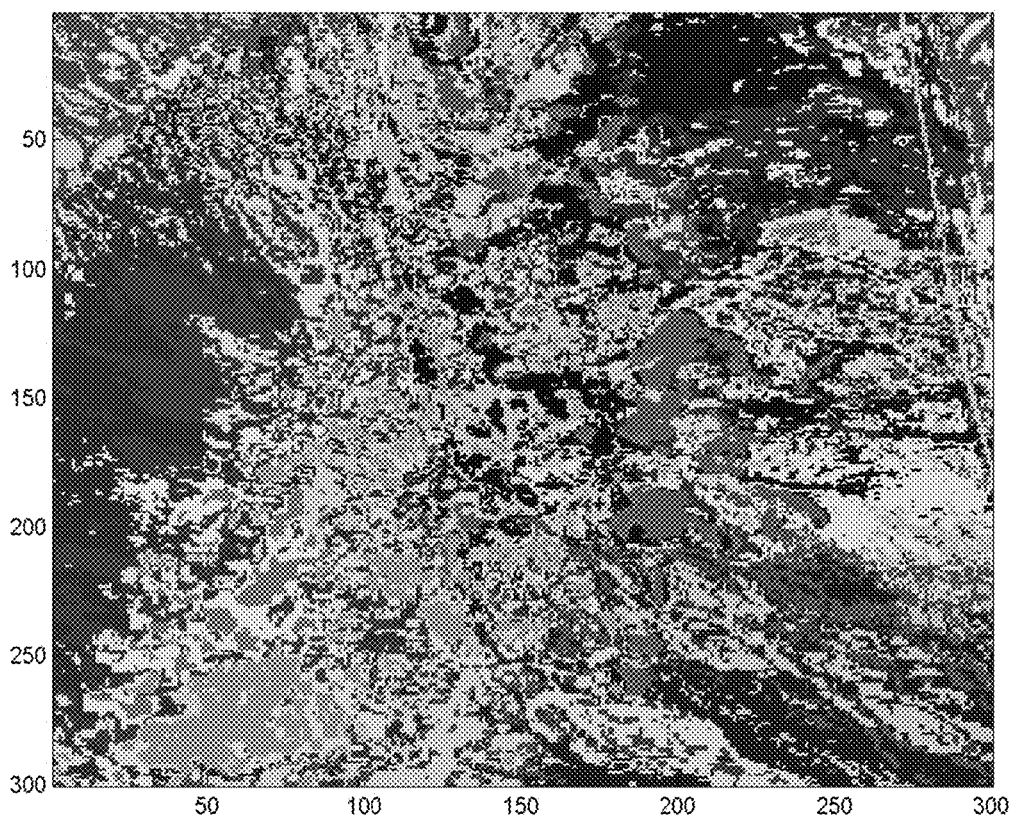
Figure 12C:
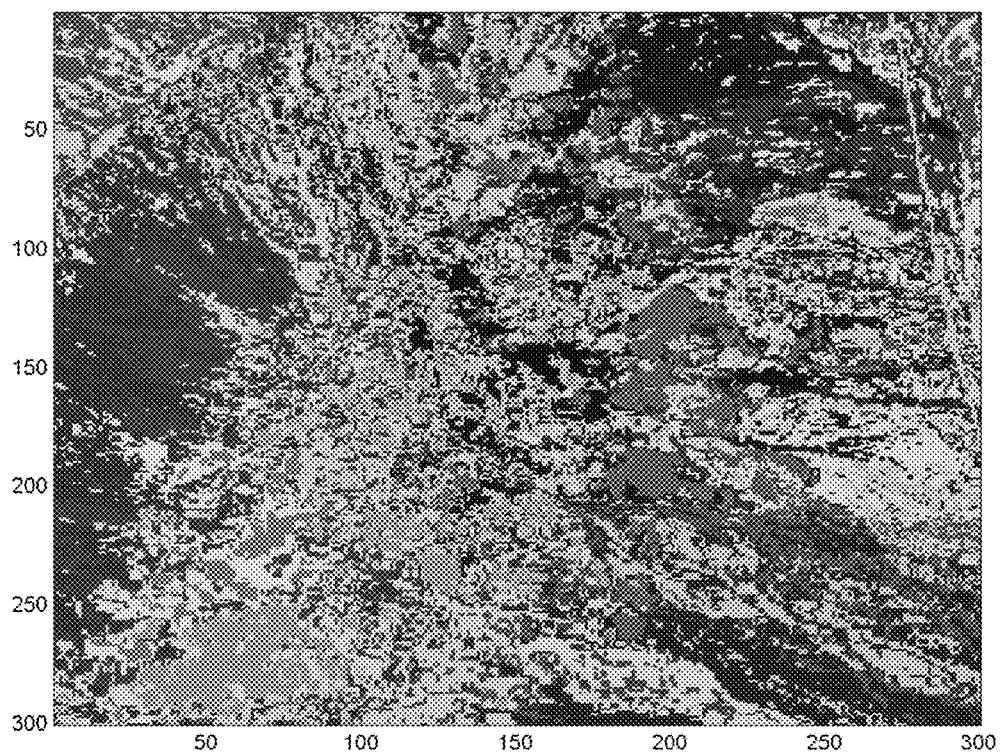
Figure 12D:
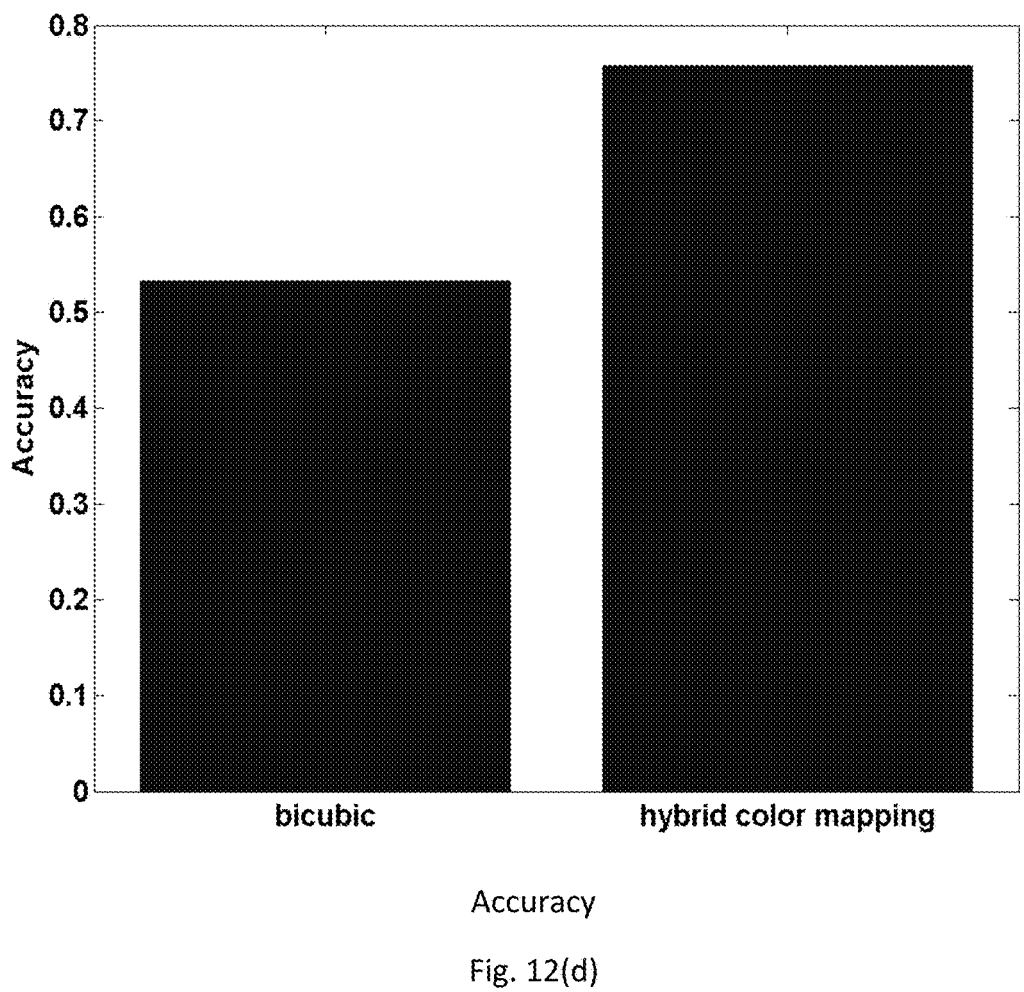
Figure 14:
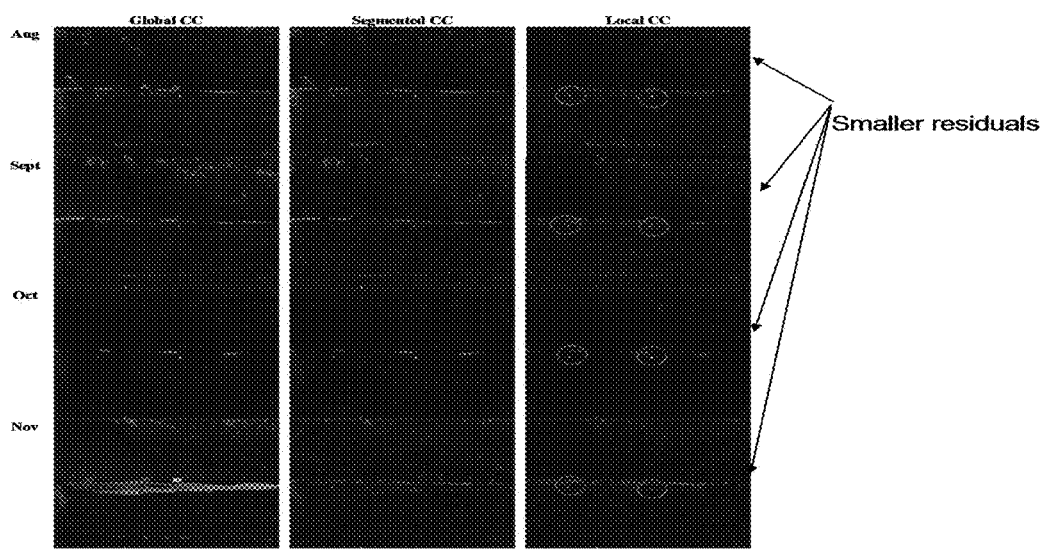
FIG. 14 shows the performance of CC using 4 pairs of hyperspectral images.

An illustrative diagram of the global version is depicted in FIG. 8. In the global version, the whole face image is vectorized and the sparsity coefficient vector estimations are done using these whole-face image vectors. Also, a local version of the sparsity driven approach is implemented, which is not shown here due to space limitation.

5. Novel Concentration Estimation Algorithm

Support Vector Machine (SVM) and non-deep neural networks (NN) have been used in many pattern classification applications. However, there is a lot of room for further improvement. This is because SVM and non-deep NN have only one or two layers of tunable parameters. Since pattern recognition and concentration estimation are complex and involve sophisticated features, SVM and non-deep NN may be restricted in achieving high classification rate.

To further improve the chemical element classification and composition estimation performance in volcano monitoring, applying Deep Neural Network (DNN) techniques is proposed. Possible applications include ash detection and composition estimation, and $SO_2$ concentration estimation. Two of the DNN techniques are adapted to the element classification and chemical composition estimation problem. They are the Deep Belief Network (DBN) and Convolutional Neural Network (CNN), which can be obtained online at, https://github.com/rasmusbergpalm/DeepLearnToolbox. DNN techniques have the following known advantages:

Better capture of hierarchical feature representations;
Ability to learn more complex behaviors;
Better performance than conventional methods;
Use distributed representations to learn the interactions of many different factors on different levels;
Can learn from unlabeled data such as using the RBM pre-training method; and
Performance can scale up with the number of hidden layers and hidden nodes on fast GPUs.

Registration Experimental Results

Example: Demonstration of subpixel level registration errors with the two-step registration approach using actual Mars MASTCAM images (SOLDAY 188).

The present invention used one of the MASTCAM stereo image pair (RGB images) to demonstrate the effectiveness of the two-step image registration approach. This stereo image is a partial image from the SOLDAY 188 data. FIG. 9a shows the left MASTCAM image which will be used as the reference image. FIG. 9b shows the right MASTCAM image which is going to be aligned to the left camera image. FIG. 9c shows the aligned image after the first step with RANSAC. FIG. 9d shows final aligned image after the second step with Diffeomorphic registration. In order to show the effectiveness of the registration approach, the difference image between the aligned image and the left camera image in each of the two steps of the two-step registration approach is first used. The difference images can be seen in FIGS. 10a and 10b, respectively. The registration errors can be easily noticed in the first step of registration with RANSAC. Wherein, after the second step with Diffeomorphic registration, the errors in the difference image can be hardly noticed. In order to assess the performance of the two-step registration accuracy, a "pixel-distance" type measure is designed. In this measure, first the SURF features in the reference image and the aligned images in each step are located. Then, the matching SURF features in the reference image and the aligned image are identified. The identification is repeated for the pair of "reference image and RANSAC aligned image", and "reference image and final aligned image". Finally, the norm values for each matching SURF feature pair are identified. The average of the norm values is considered as a quantitative indicator that provides information about the registration performance. FIGS. 11a and 11b show the matching features in each step of the two-step registration approach. FIG. 11c shows the resultant pixel distances in the matched SURF features in each step of the two-step registration approach. It can be clearly noticed that the second step of the two-step registration process reduces the registration errors to subpixel levels.

Spatial Resolution Enhancement Experimental Results

AVIRIS hyperspectral data is used in the experiment of the present invention. In each experiment, the image is downscaled by 3 times using the bi-cubic interpolation method. The downscaled image is used as low resolution hyperspectral image. R, G, B bands are picked from the original high resolution hyperspectral image for color mapping. The bi-cubic method in the following plots is implemented by upscaling the low resolution image using Bi-cubic interpolation. The results of Bi-cubic method are used as a baseline for comparison study. FIGS. 12(a)-(d) shows classification results using the endmembers extracted from ground truth AVIRIS hyperspectral image. The AVIRIS data has 213 bands with wavelengths range from 380 nm to 2500 nm. The K-means endmember extraction technique is used. As a result, the Hybrid color mapping is significantly better than the Bi-cubic method. The images also show that the Hybrid color mapping produces much finer classification details than the Bi-cubic method.

Change Detection Results

As shown in FIG. 13, four pairs of hyperspectral images from the USAF are used for demonstration. The first 4 images contain no targets, and the fifth image contains two small targets. From these images, we can create 4 pairs for change detection: (a) and (e), (b) and (e), (c) and (e), and (d) and (e).

It is believed that it might be worthwhile to apply local prediction methods. Local prediction methods should yield better performance since local information has less variation. Hence, in the present invention, we developed 3 versions of CC: Global CC, segmented CC, and local CC. Global CC uses the whole image, segmented CC uses regional segments in an image, and local CC uses only local information. Local prediction using CC yields the better performance (smaller residuals) as compared to their global counterparts. Note that there are 4 pairs of change detection results.

Figure 15:
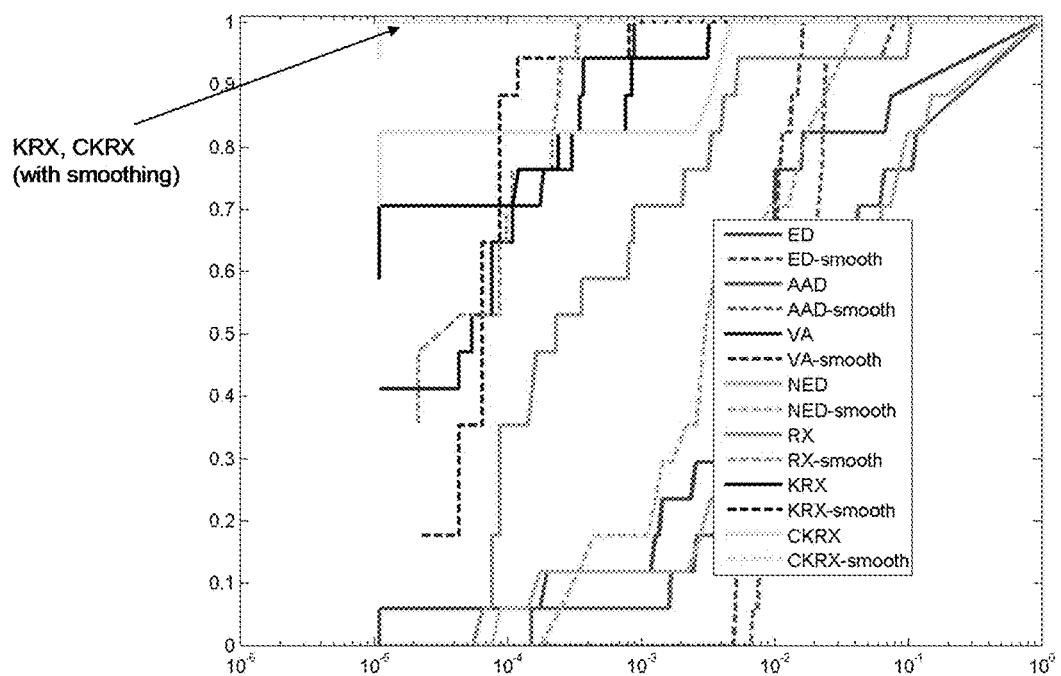
FIG. 15 shows ROC curves using change detection results.

In the present invention, some ROC curves obtained by using actual hyperspectral images from the AF are shown. Many change detection algorithms have been implemented and compared. FIG. 15 shows the ROC curves. It can be seen that KRX and CKRX gave excellent performance, as their ROC curves almost reach ideal performance.

Sparsity Based Algorithm for Bottom-Type Classification

As shown in FIG. 16, the recognition performance of the global version, i.e. use the whole face of the sparsity-driven face recognition method, has been examined on the Extended Yale B face database. There are 38 subjects and each subject has 64 faces with different illuminations. In addition to considering only the frontal images, the test face images are also rotated at four different rotational degrees to see how the performance of the sparsity-driven face recognition method will be affected. It should be noted that the down-sampled images of Extended Yale B face database of size 32×28 are used in this test. Additionally, when rotational effects are introduced to the test face images, the original size image (192×168) has been rotated and then downsampling is applied to the rotated test image. Also, it should be noted that rotational effects are only applied to the face images in the testing set, but not to the face images in the training set. In other words, the dictionary only contains the frontal face images.

Figure 16A:

As can be seen, a maximum recognition rate of 95.02% can be achieved with the global version. This high recognition rate is quite remarkable considering the fact that there are quite a number of poor illuminated images, as shown in FIGS. 16(a) and 16(b).

Concentration Estimation Algorithm Using Deep Neural Network

Figures 17A, 17B:
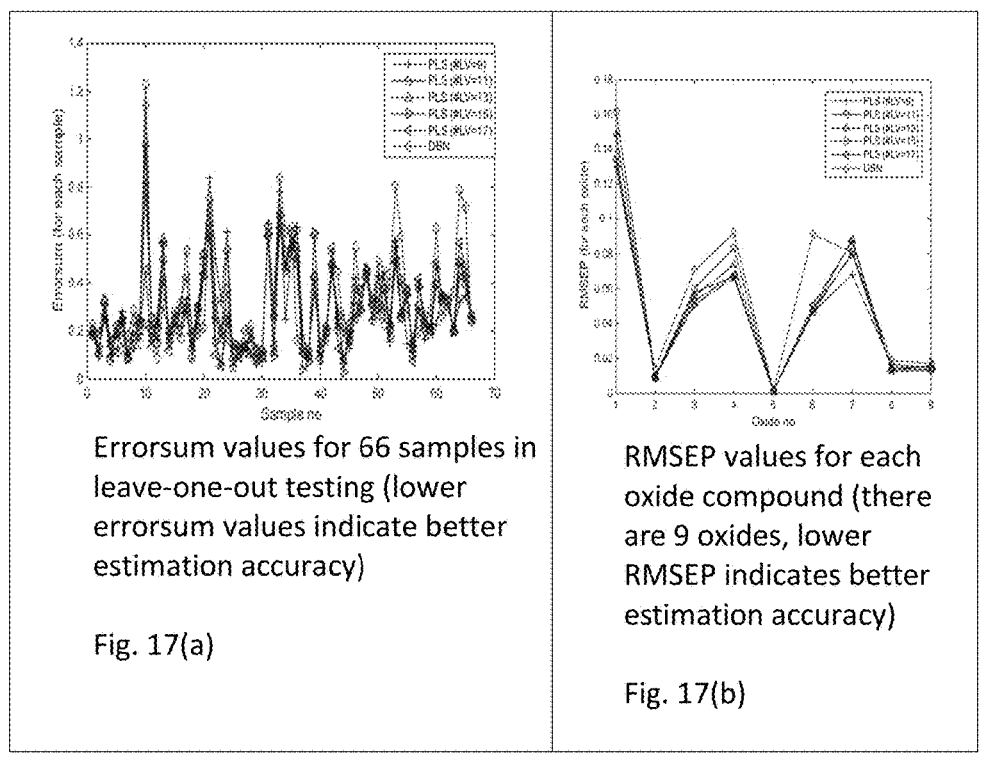
FIGS. 17(a) & 17(b) show preliminary results with the adaptation of DBN technique to chemical composition estimation in LIBS.

In the past few years, research has been heavily conducted in applying DNN for various applications, as shown in the reference, "Representation Learning: A Review and New Perspectives". One of the applications which DNN techniques have proved them is the handwritten digit recognition application. In the present invention, the DBN (Deep Belief Network) technique is applied to the laser induced breakdown spectroscopy (LIBS) spectrum database (66 samples) as a preliminary investigation. The total number of oxides is 9 and these 9 oxide compounds are: 1) $SiO_2$; 2) $TiO_2$; 3) $Al_2O_3$; 4) $Fe_2O_3$; 5) MnO; 6) MgO; 7) CaO; 8) $Na_2O$; and 9) $K_2O$. A Leave-one-out (LOO) testing framework is applied to the LIBS dataset of 66 samples to estimate oxide compositions. Two performance measures are computed: a) Error sum (the sum of absolute error in the sample estimate and its ground truth), b) RMSEP (to assess the estimation accuracy for each of the 9 oxide compounds). The initial results were quite encouraging for a DBN with 3-Level architecture (Level-1: RBM with 50 hidden units, Level-2: RBM with 50×50 hidden units) and Level-3 (connection to output with NN) with 1000 epochs. Comparable results for DBN to the PLS technique are observed. The resultant performance measures with PLS and DBN technique can be seen in FIG. 17(b). It is quite likely to see further improvement in the composition estimation results after customization of the DBN architecture and the number of hidden DBN units.

It will be apparent to those skilled in the art that various modifications and variations can be made to the system and method of the present disclosure without departing from the scope or spirit of the disclosure. It should be perceived that the illustrated embodiments are only preferred examples of describing the invention and should not be taken as limiting the scope of the invention.

What is claimed is:

1. A method of collaborative remote sensing using a plurality of satellites, comprising the steps:
producing a plurality of remote sensing images by said plurality of satellites, wherein each of said remote sensing images comprises a set of data in two-dimensional arrays of pixels of received electromagnetic radiation;
monitoring high temporal resolution images; registering said high temporal resolution images;
creating an alignment of a first image of said remote sensing images with a second image of said remote sensing images, wherein said first image or said second image is produced through color mapping a multispectral or hyperspectral image having a lower resolution with a first color image having a higher resolution;
detecting differences between said first image and said second image in said alignment;
from said first image or said second image:
classifying coral reefs;
detecting an anomaly change in said coral reefs; and
estimating the concentration of Sulphur Dioxide (SO2) in volcanic ashes.

2. The method of claim 1, wherein
the high temporal resolution images registering is incorporated by a two-step image registration algorithm;
said step of creating an alignment further comprises:
detecting a first set of speeded-up robust features in said first image;
detecting a second set of speeded-up robust features in said second image;
matching said first set of speeded-up robust features with said second set of speeded-up robust features;
estimating a geometric transformation between said first image and said second image using random sample consensus;
applying said geometric transformation to said second image to create a transformed image; and
applying diffeomorphic registration to create said alignment between said first image and said transformed image.

3. The method of claim 2, further comprising:
simulating a second color image having said lower resolution according to said first color image;
minimizing a mean square error between multispectral or hyperspectral pixels of said multispectral or hyperspectral image and color pixels of said second color image to create a transformation matrix; and
creating said first image or said second image according to said first color image and said transformation matrix.

4. The method of claim 1, wherein
the anomaly change detection determines changes between any two remote sensing images;
said step of detecting differences further comprises:
transforming said first image into a first residual using a chrono-chrome algorithm;
transforming said second image into a second residual using said chrono-chrome algorithm;
clustering pixels of said first residual to create a first set of cluster centers;
clustering pixels of said second residual to create a second set of cluster centers; and
performing a kernel RX algorithm to detect changes between said first set of cluster centers and said second set of cluster centers.

5. The method of claim 4, wherein
the concentration estimation is determined by a Deep Neural Network algorithm;
said first image or said second image is produced through color mapping a multispectral or hyperspectral image having a lower resolution with a first color image having a higher resolution, further comprising:
simulating a second color image having said lower resolution according to said first color image;
minimizing a mean square error between multispectral or hyperspectral pixels of said multispectral or hyperspectral image and color pixels of said second color image to create a transformation matrix; and
creating said first image or said second image according to said first color image and said transformation matrix.

6. The method of claim 1, wherein
said first image or said second image is produced through color mapping a multispectral or hyperspectral image having a lower resolution with a first color image having a higher resolution, further comprising:

simulating a second color image having said lower resolution according to said first color image;
minimizing a mean square error between multispectral or hyperspectral pixels of said multispectral or hyperspectral image and color pixels of said second color image to create a transformation matrix; and
creating said first image or said second image according to said first color image and said transformation matrix.

7. The method of claim 1, further comprising:
classifying said first image or said second image as a first classification of a plurality of classifications;
vectorizing said first image or said second image as a vectorized image; and
classifying said vectorized image as said first classification when said vectorized image is a first sparse linear combination corresponding to training images representative of said first classification of a plurality of linear combinations corresponding respectively to said plurality of classifications.

8. The method of claim 7, wherein
said step of creating an alignment further comprising:
detecting a first set of speeded-up robust features in said first image;
detecting a second set of speeded-up robust features in said second image;
matching said first set of speeded-up robust features with said second set of speeded-up robust features;
estimating a geometric transformation between said first image and said second image using random sample consensus;
applying said geometric transformation to said second image to create a transformed image; and
applying diffeomorphic registration to create said alignment between said first image and said transformed image.

9. The method of claim 8, wherein
said first image or said second image is produced through color mapping a multispectral or hyperspectral image having a lower resolution with a first color image having a higher resolution, further comprising:
simulating a second color image having said lower resolution according to said first color image;
minimizing a mean square error between multispectral or hyperspectral pixels of said multispectral or hyperspectral image and color pixels of said second color image to create a transformation matrix; and
creating said first image or said second image according to said first color image and said transformation matrix.

10. The method of claim 7, wherein
said step of detecting differences comprises:
transforming said first image into a first residual using a chrono-chrome algorithm;
transforming said second image into a second residual using said chrono-chrome algorithm;
clustering pixels of said first residual to create a first set of cluster centers;
clustering pixels of said second residual to create a second set of cluster centers; and
performing a kernel RX algorithm to detect changes between said first set of cluster centers and said second set of cluster centers.

11. The method of claim 10, wherein
said first image or said second image is produced through color mapping a multispectral or hyperspectral image having a lower resolution with a first color image having a higher resolution, further comprising:
simulating a second color image having said lower resolution according to said first color image;
minimizing a mean square error between multispectral or hyperspectral pixels of said multispectral or hyperspectral image and color pixels of said second color image to create a transformation matrix; and
creating said first image or said second image according to said first color image and said transformation matrix.

12. The method of claim 7, wherein
said first image or said second image is produced through color mapping a multispectral or hyperspectral image having a lower resolution with a first color image having a higher resolution, further comprising:
simulating a second color image having said lower resolution according to said first color image;
minimizing a mean square error between multispectral or hyperspectral pixels of said multispectral or hyperspectral image and color pixels of said second color image to create a transformation matrix; and
creating said first image or said second image according to said first color image and said transformation matrix.

13. The method of claim 1, further comprising;
estimating said concentration within said first image or said second image with a Deep Belief Network (DBN) or a Deep Neural Network (DNN).

14. The method of claim 13, wherein
said step of creating an alignment further comprises:
detecting a first set of speeded-up robust features in said first image;
detecting a second set of speeded-up robust features in said second image;
matching said first set of speeded-up robust features with said second set of speeded-up robust features;
estimating a geometric transformation between said first image and said second image using random sample consensus;
applying said geometric transformation to said second image to create a transformed image; and
applying diffeomorphic registration to create said alignment between said first image and said transformed image.

15. The method of claim 14, wherein
said first image or said second image is produced through color mapping a multispectral or hyperspectral image having a lower resolution with a first color image having a higher resolution, further comprising:
simulating a second color image having said lower resolution according to said first color image;
minimizing a mean square error between multispectral or hyperspectral pixels of said multispectral or hyperspectral image and color pixels of said second color image to create a transformation matrix; and
creating said first image or said second image according to said first color image and said transformation matrix.

16. The method of claim 13, wherein
said step of detecting differences further comprising:
transforming said first image into a first residual using a chrono-chrome algorithm;
transforming said second image into a second residual using said chrono-chrome algorithm;
clustering pixels of said first residual to create a first set of cluster centers;
clustering pixels of said second residual to create a second set of cluster centers; and
performing a kernel RX algorithm to detect changes between said first set of cluster centers and said second set of cluster centers.

17. The method of claim 16, wherein
said first image or said second image is produced through color mapping a multispectral or hyperspectral image having a lower resolution with a first color image having a higher resolution, further comprising:
simulating a second color image having said lower resolution according to said first color image;
minimizing a mean square error between multispectral or hyperspectral pixels of said multispectral or hyperspectral image and color pixels of said second color image to create a transformation matrix; and
creating said first image or said second image according to said first color image and said transformation matrix.

18. The method of claim 13, wherein
said first image or said second image is produced through color mapping a multispectral or hyperspectral image having a lower resolution with a first color image having a higher resolution, further comprising:
simulating a second color image having said lower resolution according to said first color image;
minimizing a mean square error between multispectral or hyperspectral pixels of said multispectral or hyperspectral image and color pixels of said second color image to create a transformation matrix; and
creating said first image or said second image according to said first color image and said transformation matrix.

19. The method of claim 7, wherein
said first image and said second image are of said coral reef, and a bottom type of said coral reef is classified through said classifying said vectorized image step.

* * * * *